United States Patent
Yokoi et al.

(10) Patent No.: US 10,024,266 B2
(45) Date of Patent: Jul. 17, 2018

(54) DIRECT INJECTION ENGINE CONTROLLING DEVICE

(71) Applicant: DENSO CORPORATION, Kariya, Aichi-pref. (JP)

(72) Inventors: Masahiro Yokoi, Kariya (JP); Hiroaki Fujii, Kariya (JP); Yusaku Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/864,135

(22) Filed: Jan. 8, 2018

(65) Prior Publication Data
US 2018/0128201 A1 May 10, 2018

Related U.S. Application Data

(62) Division of application No. 14/902,674, filed as application No. PCT/JP2014/003183 on Jun. 16, 2014, now Pat. No. 9,897,035.

(30) Foreign Application Priority Data

Jul. 4, 2013 (JP) ................................. 2013-140826

(51) Int. Cl.
*F02D 41/00* (2006.01)
*F02D 37/02* (2006.01)
(Continued)

(52) U.S. Cl.
CPC ....... *F02D 41/402* (2013.01); *F02D 13/0219* (2013.01); *F02D 37/02* (2013.01);
(Continued)

(58) Field of Classification Search
CPC .. F02D 41/0065; F02D 41/402; F02D 41/401; F02D 41/0062; F02D 41/068;
(Continued)

(56) References Cited

U.S. PATENT DOCUMENTS

| 6,067,954 A | 5/2000 | Kudou et al. |
| 6,085,718 A | 7/2000 | Nishimura et al. |

(Continued)

FOREIGN PATENT DOCUMENTS

| JP | H04-350342 | 12/1992 |
| JP | 2004-232575 | 8/2004 |

(Continued)

OTHER PUBLICATIONS

International Search Report and Written Opinion of the ISA for PCT/JP2014/003183 dated Jul. 8, 2014, 13 pages.

*Primary Examiner* — Lindsay Low
*Assistant Examiner* — George Jin
(74) *Attorney, Agent, or Firm* — Nixon & Vanderhye PC

(57) ABSTRACT

An engine (10) is a cylinder injection engine, and includes an injector (21) that directly injects a fuel into a combustion chamber (23), and an ignition plug (34) that generates an ignition spark in the combustion chamber (23). An ECU (40) performs multiple first injections to each produce an air-fuel mixture of a lean air-fuel ratio in the combustion chamber (23) before an ignition in one combustion cycle of the engine, and performs a second injection to produce an air-fuel mixture of a rich air-fuel ratio in the combustion chamber (23) before the ignition and after the first injection. In particular, the ECU implements the multiple first injections in such a manner that the first injection implemented early among the multiple first injections produces an air-fuel mixture leaner than that of the first injection implemented subsequently. The ECU implements the second injection only once immediately before an ignition timing.

16 Claims, 3 Drawing Sheets

(51) Int. Cl.
*F02D 41/40* (2006.01)
*F02P 5/15* (2006.01)
*F02P 5/04* (2006.01)
*F02D 41/06* (2006.01)
*F02D 41/30* (2006.01)
*F02D 41/38* (2006.01)
*F02B 75/12* (2006.01)
*F02D 13/02* (2006.01)
*F02D 15/04* (2006.01)

(52) U.S. Cl.
CPC ....... *F02D 41/0062* (2013.01); *F02D 41/068* (2013.01); *F02D 41/3023* (2013.01); *F02D 41/401* (2013.01); *F02P 5/045* (2013.01); *F02P 5/1506* (2013.01); *F02B 2075/125* (2013.01); *F02D 13/0269* (2013.01); *F02D 15/04* (2013.01); *F02D 2041/389* (2013.01); *Y02T 10/123* (2013.01); *Y02T 10/142* (2013.01); *Y02T 10/18* (2013.01); *Y02T 10/44* (2013.01); *Y02T 10/46* (2013.01); *Y02T 10/47* (2013.01)

(58) Field of Classification Search
CPC .. F02D 41/047; F02D 41/064; F02D 41/3023; F02D 41/0255; F02D 41/006; F02D 41/0235; F02D 41/024; F02D 41/403; F02D 37/02; F02D 35/026; F02D 13/0219; F02D 2041/389; F02D 15/00; F02D 15/02; F02D 15/04; F02P 5/045; F02P 5/1506; F02P 5/1516
See application file for complete search history.

(56) References Cited

U.S. PATENT DOCUMENTS

| | | | |
|---|---|---|---|
| 6,325,041 | B1 | 12/2001 | Mamiya et al. |
| 6,345,499 | B1 | 2/2002 | Nishimura et al. |
| 2003/0066508 | A1 | 4/2003 | Nakayama et al. |
| 2004/0187840 | A1 | 9/2004 | Nakayama et al. |
| 2006/0000440 | A1 | 1/2006 | Kohler |
| 2007/0023006 | A1 | 2/2007 | Takeda et al. |
| 2008/0228378 | A1* | 9/2008 | Kohler ............... F02D 41/064 701/103 |
| 2011/0005496 | A1 | 1/2011 | Hiraya |
| 2011/0155097 | A1* | 6/2011 | Matsumura ......... F02D 41/401 123/299 |

FOREIGN PATENT DOCUMENTS

| | | |
|---|---|---|
| JP | 2005-220857 | 8/2005 |
| JP | 2006-194098 | 7/2006 |
| JP | 2010-048212 | 3/2010 |
| JP | 2010-163930 | 7/2010 |
| JP | 2012-031735 | 2/2012 |
| WO | 2009011452 A2 | 1/2009 |

* cited by examiner

DIRECT INJECTION ENGINE CONTROLLING DEVICE

CROSS REFERENCE TO RELATED APPLICATION

This is a divisional of U.S. application Ser. No. 14/902,674, filed on Jan. 4, 2016, which is the U.S. National Phase of PCT/JP2014/003183, filed on Jun. 16, 2014, which designated the U.S. and claims priority to Japanese Patent Application No. 2013-140826 filed on Jul. 4, 2013, the entire contents of each of which are hereby incorporated by reference.

TECHNICAL FIELD

The present disclosure relates to a direct injection engine controlling device.

BACKGROUND ART

A cylinder injection engine configured to directly inject a fuel into a cylinder has been known. In the cylinder injection engine, the degree of freedom of injection timing, that is, the degree of freedom of an air-fuel mixture production is improved as compared with a conventional port injection engine. For example, during catalyst early warm-up at the time of cold start of an engine, a fuel injection is performed during an intake stroke and immediately before ignition (a compression stroke or an expansion stroke) to produce a rich (air excess ratio $\lambda<1.0$) air-fuel mixture in the vicinity of an ignition plug, and further an ignition timing is greatly retarded than a normal ignition timing. This makes it possible to raise an exhaust temperature and accelerate the warm-up of a catalyst.

In the cylinder injection engine, a rich portion is locally produced in a combustion chamber, and a particulate matter (PM) is produced due to the occurrence of oxygen deficiency in the rich portion, and the adherence of the fuel onto a cylinder wall surface or a piston upper surface.

For example, when the rich air-fuel mixture is produced in the vicinity of the ignition plug, a PM emission amount is increased due to the oxygen deficiency. For that reason, it is desirable that the fuel injection amount immediately before the ignition is reduced in a range where combustion stability can be maintained. However, a reduction in the fuel injection amount immediately before the ignition leads to an increase in the injection amount during the intake stroke, and in that situation, the fuel adhered to the cylinder wall surface or the piston upper surface increases. Therefore, it is difficult to sufficiently reduce the PM.

In the engine disclosed in Patent Literature 1, the fuel injection is divided in three or more times, and implemented to thereby produce a stratified air-fuel mixture within the combustion chamber. In performing the fuel injection for each combustion cycle, a lean air-fuel mixture higher in local air-fuel ratio (air excess ratio) than 1.0 is produced in the combustion chamber due to a first injection, and thereafter the air-fuel mixture equal to or smaller than 1.0 in the local air-fuel ratio is produced in the combustion chamber due to a second injection. Further, a third injection for producing the ignitable air-fuel mixture locally rich in a region of the ignition plug is performed immediately before the ignition timing.

However, in both of the second injection and the third injection subsequent to the first injection, the air-fuel mixture of the rich air-fuel ratio is produced, and an air-fuel mixture ratio of the rich air-fuel ratio naturally becomes higher in the combustion chamber. In that case, there arises such a problem that the emission amount of the PM is rapidly increased on the border of a theoretical air-fuel ratio. On the other hand, from the viewpoint of ensuring a combustion stability, it is desirable to properly provide a rich air-fuel mixture in the vicinity of the ignition plug.

PRIOR ART LITERATURES

Patent Literature

[Patent Literature 1] Japanese Patent No. 4782836

SUMMARY OF INVENTION

It is an object of the present disclosure to provide a control device for a cylinder injection engine which is capable of performing both of an improvement in exhaust emission and a combustion stability.

According to the present disclosure, a control device for a cylinder injection engine includes a first injection control unit that performs a plurality of first injections by a fuel injection valve to each produce an air-fuel mixture of a lean air-fuel ratio in a combustion chamber before an ignition device performs an ignition in one combustion cycle of an engine; and a second injection control unit that performs a second injection by the fuel injection valve to produce an air-fuel mixture of a rich air-fuel ratio in the combustion chamber before the ignition of the ignition device and after the first injections. The first injection control unit implements the plurality of first injections in such a manner that the first injection implemented early among the plurality of first injections produces an air-fuel mixture leaner than that of the first injection implemented subsequently, and the second injection control unit implements the second injection only once immediately before an ignition timing of the ignition device.

In the above configuration, in performing the respective fuel injections for each combustion cycle in the cylinder injection engine, the fuel injection (first injection) for producing the air-fuel mixture of the lean air-fuel ratio in the combustion chamber is implemented twice or more, and the fuel injection (second injection) for producing the air-fuel mixture of the rich air-fuel ratio in the combustion chamber is implemented only once after the first injections and immediately before the ignition timing. With the above operation, the air-fuel mixture stratified into three or more layers is produced in the combustion chamber. In particular, in the combustion chamber, the rich air-fuel mixture is produced only in the vicinity of an ignition position of the ignition device, and the lean air-fuel mixture leaner stepwise toward the cylinder wall surface or the piston upper surface is produced around the rich air-fuel mixture.

With the production of the air-fuel mixture described above, it is difficult to adhere the fuel to the cylinder wall surface or the piston upper surface, and the PM production in the combustion chamber can be suppressed. Because the air-fuel mixture is enriched more toward a center (the ignition position of the ignition device) of the combustion chamber, the ignitability and the combustion performance of the fuel are ensured. With the above configuration, both of an improvement in the exhaust emission and the ensuring of the combustion stability can be achieved.

BRIEF DESCRIPTION OF DRAWINGS

The above and other objects, features and advantages of the present disclosure will become more apparent from the following detailed description made with reference to the accompanying drawings.

EMBODIMENTS FOR CARRYING OUT INVENTION

Hereinafter, an embodiment of the present disclosure will be described with reference to the drawings. In this embodiment, a multi-cylinder four-cycle gasoline engine of a cylinder injection type which is mounted in a vehicle is to be controlled, and an electronic control of various actuators in the engine is implemented. An overall schematic configuration of the engine control system will be described with reference to FIG. 1.

Figure 1:
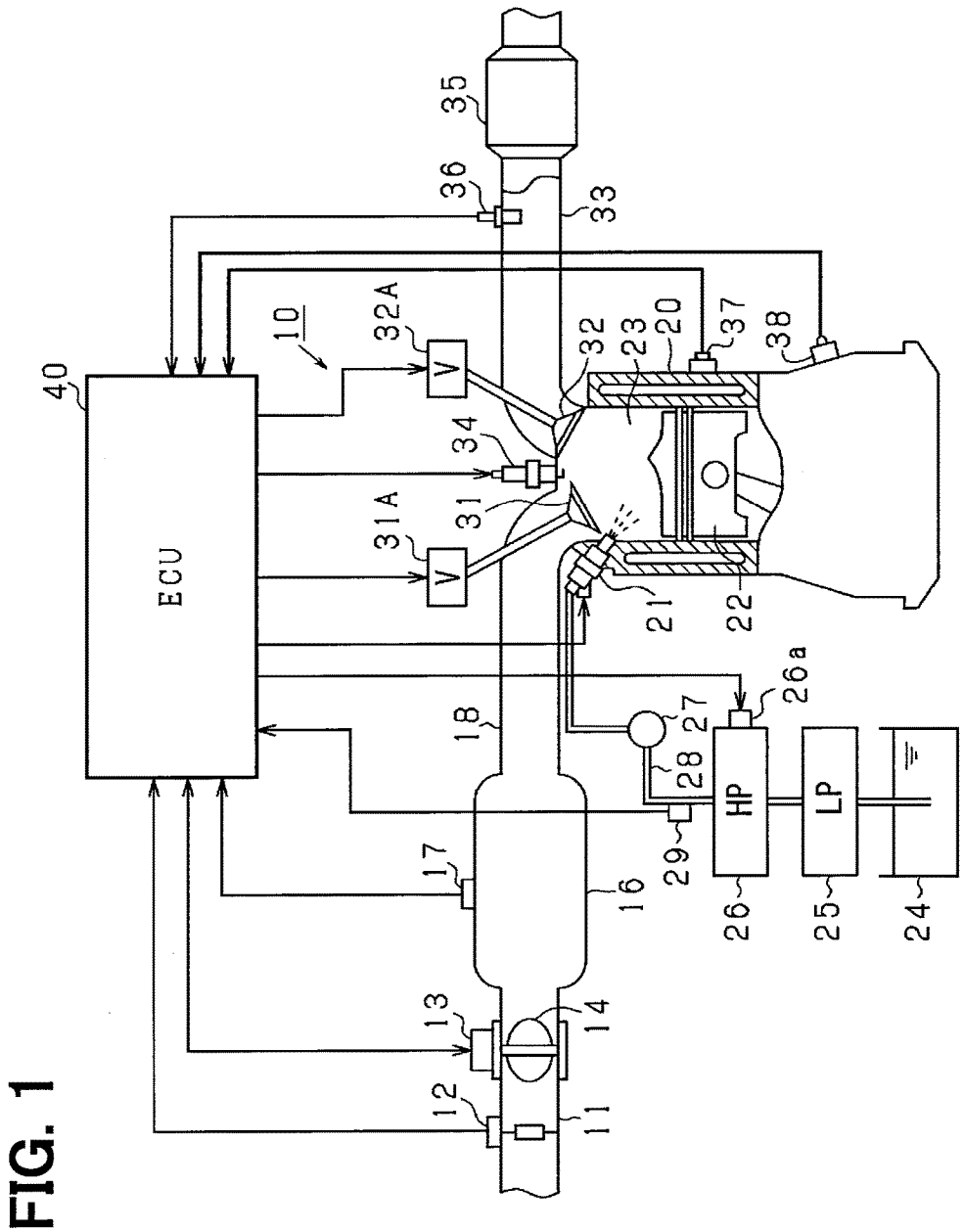
FIG. 1 is a configuration diagram illustrating an outline of an engine control system.

In a cylinder injection engine (hereinafter referred to as "engine 10") illustrated in FIG. 1, an air flow meter 12 for detecting an intake air amount is disposed on an upstream part of an intake pipe 11. A throttle valve 14 whose opening is adjusted by a throttle actuator 13 such as a DC motor is disposed on a downstream side of the air flow meter 12, and the opening (throttle opening) of the throttle valve 14 is detected by a throttle opening sensor incorporated into the throttle actuator 13. A surge tank 16 is disposed on a downstream side of the throttle valve 14, and an intake pipe pressure sensor 17 for detecting an intake pipe pressure is disposed in the surge tank 16. The surge tank 16 is connected with an intake manifold 18 for introducing an air into the respective cylinders of the engine 10.

An electromagnetic drive type injector 21 is disposed in a cylinder block 20 for each cylinder, the fuel is injected directly into a combustion chamber 23 from the injector 21, and the combustion chamber 23 is partitioned by a cylinder inner wall and an upper surface of a piston 22. A high-pressure fuel is supplied to the injector 21 from a high-pressure fuel system having a high-pressure pump.

The high-pressure fuel system will be described in brief. The system includes a low pressure pump 25 that pumps the fuel within a fuel tank 24, a high-pressure pump 26 that pressurizes a low pressure fuel pumped by the low pressure pump 25, and a delivery pipe 27 configuring an accumulator which accumulates the high-pressure fuel discharged from the high-pressure pump 26. The delivery pipe 27 is connected with the injectors 21 of the respective cylinders. The high-pressure fuel pressurized by the high-pressure pump 26 and accumulated in the delivery pipe 27 is injected into the combustion chamber 23 (in cylinder) by the injector 21. A fuel pressure sensor 29 as a fuel pressure detection unit for detecting a fuel pressure is disposed in a high-pressure fuel pipe 28 that connects the high-pressure pump 26 and the delivery pipe 27, or in the delivery pipe 27.

The high-pressure pump 26 is a mechanical fuel pump, and is driven by the rotation of a cam shaft of the engine 10. The fuel discharge amount of the high-pressure pump 26 is controlled by the opening of a fuel pressure control valve 26a disposed in the pump 26, and a fuel pressure in the delivery pipe 27 is pressurized to, for example, about 20 MPa at a maximum. The fuel pressure control valve 26a includes a suction control valve for adjusting the amount of fuel suctioned into a fuel pressurizing chamber of the high-pressure pump 26, or a discharge control valve for adjusting the amount of fuel discharged from the fuel pressurizing chamber, and the fuel pressure in the delivery pipe 27 is variably controlled by the opening adjustment of the fuel pressure control valve 26a.

An intake port and an exhaust port of the engine 10 are equipped with an intake valve 31 and an exhaust valve 32 which are opened or closed according to the rotation of the cam shaft not shown, respectively. An intake air is introduced into the combustion chamber 23 due to the opening operation of the intake valve 31, and an exhaust gas that has been combusted is discharged into an exhaust pipe 33 by the opening operation of the exhaust valve 32. The intake valve 31 and the exhaust valve 32 are equipped with variable valve mechanisms 31A and 32A that vary the opening and closing timing of those valves, respectively. The variable valve mechanisms 31A and 32A are each configured to adjust a relative rotation phase between the crank shaft of the engine 10 and an intake cam shaft, and can perform a phase adjustment toward an advance side and a retard side with respect to a predetermined reference position. The variable valve mechanisms 31A and 32A are configured by a hydraulically driven or an electrically driven variable valve mechanism.

Each cylinder head of the engine 10 is equipped with an ignition plug 34 as the ignition device for each cylinder, and a high voltage is applied to the ignition plug 34 through an ignition coil not shown at a desired ignition timing. A spark discharge is generated between opposing electrodes of each ignition plug 34 by the application of the high voltage, and the fuel is ignited and combusted in the combustion chamber 23.

A catalyst 35 for purifying an exhaust gas is disposed in the exhaust pipe 33. The catalyst 35 is a three-way catalyst for purifying CO, HC, and NOx in the exhaust gas. An air-fuel ratio sensor 36 for detecting the air-fuel ratio of the air-fuel mixture in the exhaust gas to be detected is disposed on an upstream side of the catalyst 35 in the exhaust pipe 33.

In addition, the cylinder block 20 is equipped with a water temperature sensor 37 for detecting an engine coolant temperature (corresponding to an engine temperature), and a crank angle sensor 38 for outputting a rectangular crank angle signal for a predetermined crank angle (for example, a period of 10° C.A) of the engine.

Outputs of the various sensors described above are input to an electronic control unit (hereinafter referred to as "ECU 40") responsible for an engine control. The ECU 40 includes a microcomputer having a CPU, a ROM, and a RAM, and executes various control programs stored in the ROM to control a fuel injection amount of the injector 21 according to an engine operating state, and control an ignition timing of the ignition plug 34. The ECU 40 includes a first injection control unit, a second injection control unit, and an ignition control unit (ignition retard unit).

The ECU 40 calculates a basic injection amount on the basis of an engine load (for example, an intake air amount) and an engine rotation speed as parameters, and appropriately implements a coolant temperature correction and an air-fuel ratio correction on the basic injection amount to calculate a final fuel injection amount (overall injection amount). The ECU 40 determines the injection timing according to the engine operating state, generates the injection signal, and drives the injector 21 according to the injection signal.

In this embodiment, in performing the respective fuel injections for each combustion cycle, the divided injections for dividing the fuel injection in multiple times and injecting the fuel can be implemented, and at least three divided injections are implemented in a period until immediately before the ignition (compression stroke or expansion stroke) since an intake stroke. In other words, the ECU 40 implements multiple "first injections" so as to each produce an air-fuel mixture of a lean air-fuel ratio in the combustion chamber 23, and implements a "second injection" so as to produce an air-fuel mixture of a rich air-fuel ratio in the combustion chamber 23 after the implementation of the first injections. In particular, the ECU 40 implements the multiple first injections in such a manner that the first injection implemented early among the multiple first injections produces an air-fuel mixture leaner than that of the first injection implemented subsequently. The ECU 40 implements the second injection only once immediately before the ignition timing.

Figure 2:
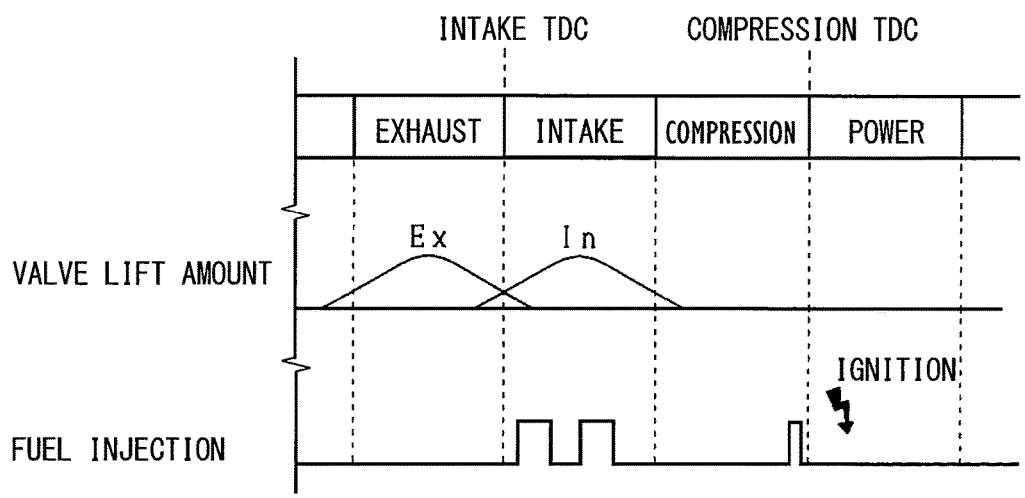
FIG. 2 is a time chart illustrating respective injection signals when three divided injections are implemented.

FIG. 2 is a time chart illustrating respective injection signals when three divided injections are implemented. In the time chart, in order to implement a catalyst warm-up during a low temperature start of the engine 10, an ignition retard control is implemented.

In FIG. 2, two lean injections (first injections) are implemented in the intake stroke, and thereafter one rich injection (second injection) is implemented in the compression stroke. The ignition is performed by the ignition plug 34 immediately after the rich injection, and the air-fuel mixture in the combustion chamber 23 is combusted by the ignition. A final rich injection may be implemented during the expansion stroke, that is, after a compression TDC in correspondence with the retarded ignition timing.

Figure 3:
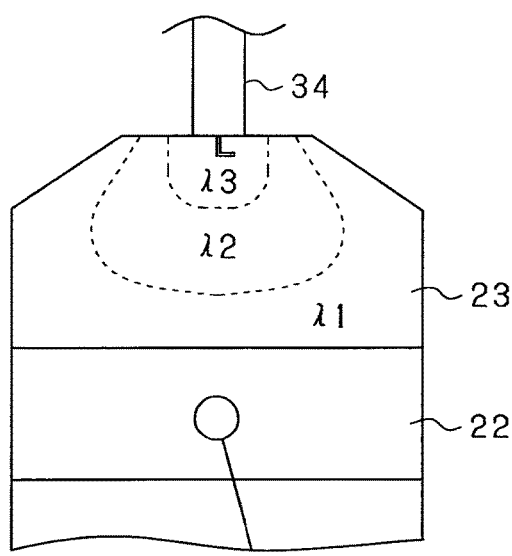
FIG. 3 is a schematic view illustrating a status of an air-fuel mixture production immediately before an ignition in a combustion chamber.

A status of the air-fuel mixture production immediately before the ignition in the combustion chamber 23 is illustrated in FIG. 3. In FIG. 3, an air-fuel mixture of $\lambda 1$ is produced by a former lean injection of two lean injections (first injections), and an air-fuel mixture of $\lambda 2$ is produced by a later lean injection. An air-fuel mixture of $\lambda 3$ is produced by the rich injection (second injection). With the above operation, an air-fuel mixture stratified into three layers is produced in the combustion chamber 23. In that case, $\lambda 1 > \lambda 2 > 1.0$ are satisfied, and in FIG. 3, both of regions indicated by $\lambda 1$ and $\lambda 2$ are under a lean atmosphere. In addition, $\lambda 3 < 1.0$ are satisfied, and in FIG. 3, a region indicated by $\lambda 3$ is under a rich atmosphere. An average $\lambda > 1.0$ is satisfied in the overall combustion chamber 23. In other words, in the combustion chamber 23, the rich air-fuel mixture is produced only in the vicinity of the ignition position of the ignition plug 34, and the lean air-fuel mixture leaner stepwise toward the cylinder wall surface or the piston upper surface is produced.

Figure 4:
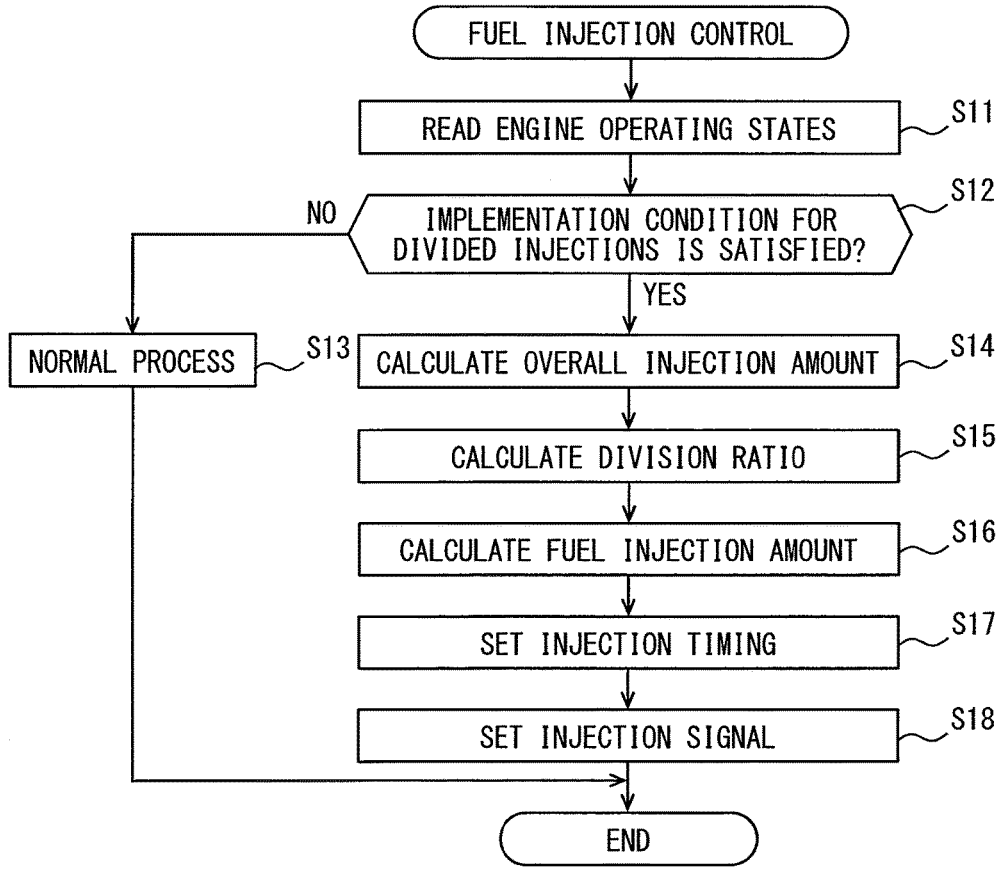
FIG. 4 is a flowchart illustrating a processing procedure of a fuel injection control.

Subsequently, the fuel injection control implemented by the ECU 40 will be described in detail. FIG. 4 is a flowchart illustrating a processing procedure of the fuel injection control, and this process is repetitively implemented by the ECU 40 in a predetermined cycle.

Referring to FIG. 4, in Step S11, the detections of the various sensors and the engine operating states (engine rotation speed, engine load, water temperature, etc.) obtained by calculation are read. In subsequent Step S12, it is determined whether a predetermined implementation condition for implementing the divided injections is satisfied at present, or not. Specifically, when all of that the catalyst 35 is in a non-warm up state, that the operating state is a steady operating state, and that no abnormality is present in a fuel injection system, an ignition system, and a sensor system are satisfied, it is determined that the implementation conditions are established. If the implementation conditions are not established, the flow proceeds to Step S13, and if the implementation conditions are established, the flow proceeds to Step S14. In Step S13, a conventional normal process is implemented. In the normal process, the overall injection amount in the present fuel injection is calculated on the basis of the engine operating state (the engine rotation speed, the engine load, etc.), and one fuel injection is implemented at an injection timing determined on the basis of the same engine operating state. The multiple fuel injections can be implemented in such a manner that the air-fuel mixture of the same air-fuel ratio is produced in the combustion chamber 23.

In Step S14, the overall injection amount in the present divided injection is calculated on the basis of the engine operating state (the engine rotation speed, the engine load, etc.). In this situation, the overall injection amount is calculated so that the air-fuel mixture to be subjected to the present combustion has a theoretical air-fuel mixture ratio or a slight lean (for example, $\lambda=1.05$), that is, the air-fuel mixture of the slight lean is produced as the overall cylinder.

Figure 5:
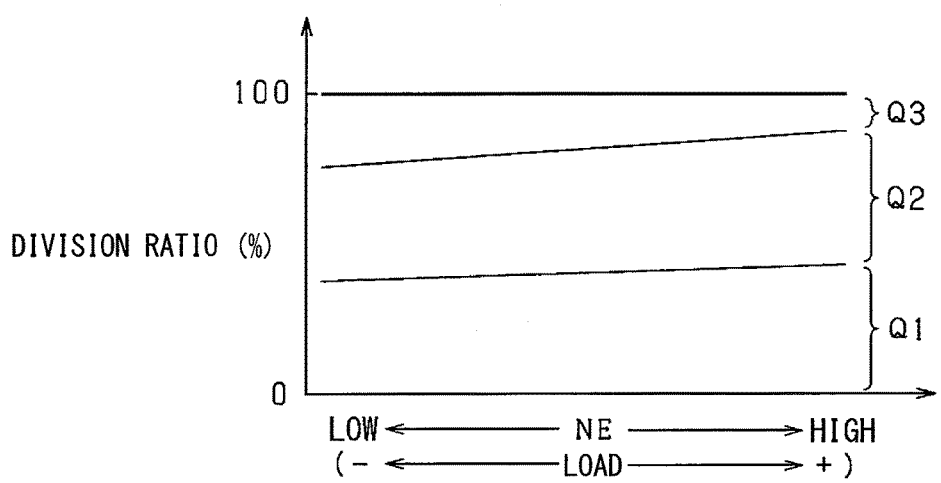
FIG. 5 is a diagram illustrating a relationship of a division ratio, an NE, and a load.

Thereafter, in Step S15, a division ratio of each injection when the division injection is implemented is calculated on the basis of the engine operating state (the engine rotation speed, the engine load, etc.). In this case, for example, three injections are implemented, and the division ratio of the three injections is calculated with the use of a relationship illustrated in FIG. 5. In FIG. 5, it is assumed that a division ratio of a first injection among the three injections in total is Q1, a division ratio of a second injection is Q2, and a division ratio of a third injection is Q3. The first injection and the second injection are the lean injections (first injections), and the third injection is the rich injection (second injection).

According to a relationship of FIG. 5, the division ratio Q3 of the third injection is increased more as the engine rotation speed NE is lower. From the viewpoint of a relationship with the engine load, the division ratio Q3 of the third injection is increased more as the engine load is smaller. The division ratio Q1 of the first injection and the division ratio Q2 of the second injection are determined at a predetermined ratio except for the division ratio Q3 of the third injection. In short, the division ratio Q3 of the third injection is increased more so as to increase the fuel amount of the third injection, under the condition in which the compression stability is lower.

In calculation of the division ratio, a correction based on the various parameters is implemented. In this example, the correction of the division ratio is implemented on the basis of a retard amount of the ignition timing and an engine water temperature. Specifically, the correction of the division ratio is implemented so that the division ratio Q3 of the third injection becomes larger as the retard amount of the ignition timing is larger, and so that the division ratio Q3 of the third injection becomes larger as the engine coolant temperature is lower. Similarly, in this case, the correction is implemented so that the fuel amount of the third injection is increased under the condition in which the combustion stability is lower.

The division ratios Q1 to Q3 of the respective first to third injections are 100% in total, and when the division ratio Q3 is increased or decreased by the correction or the like, the division ratios Q1 and Q2 are increased or decreased as much. Alternatively, the division ratio Q3 may be calculated on the basis of the engine rotation speed NE and the engine load with reference to a relationship of FIG. 5, and further after the division ratio Q3 has been appropriately corrected, the division ratios Q1 and Q2 may be calculated as "(100−Q3)/2" (Q1=Q2).

Thereafter, in Step S16, the fuel amount of each injection (first injection to third injection) is calculated by multiplication of the division ratio of each injection calculated as described above by the overall injection amount.

Thereafter, in Step S17, the injection timing (start timing of the fuel injection) is set for each injection. In this example, in the first injection and the second injection, the injection timing is so set as to satisfy such conditions that the fuel injection is performed in the intake stroke (the fuel injection is terminated within the intake stroke) for both of those injections, the air-fuel mixture of the lean air-fuel ratio can be produced in the combustion chamber 23 for each injection, and the air-fuel mixture of the first injection leaner than that of the second injection can be produced. Specifically, the injection timing is set so that the air-fuel mixture of a desired air-fuel ratio is produced on the basis of a relationship between the fuel amount of each injection and the intake air amount into the combustion chamber 23 before and after each injection. That relationship may be determined by, for example, conformity in advance.

In the third injection, the injection timing is set on the basis of the ignition timing. In this situation, the injection timing is set so that the fuel injection is terminated immediately before the ignition timing, specifically, in a range until about 10° C.A before the ignition timing.

Thereafter, in Step S18, an injection signal generated at each injection timing is set for each injection. As a result, the injector 21 is driven at a desired timing, and the fuel injection is implemented.

According to this embodiment described above in detail, the following advantageous effects are obtained.

In performing the respective fuel injections for each combustion cycle, the fuel injection (first injection) for producing the air-fuel mixture of the lean air-fuel ratio in the combustion chamber 23 is implemented multiple times, and the fuel injection (second injection) for producing the air-fuel mixture of the rich air-fuel ratio in the combustion chamber 23 is implemented only once after the first injections and immediately before the ignition timing. In particular, in the combustion chamber 23, the rich air-fuel mixture is produced only in the vicinity of the ignition position of the ignition plug 34, and the lean air-fuel mixture leaner stepwise toward the cylinder wall surface or the piston upper surface is produced around the rich air-fuel mixture. With the above configuration, it is difficult to adhere the fuel to the cylinder wall surface or the piston upper surface, and the PM production in the combustion chamber 23 can be suppressed. Because the air-fuel mixture is enriched more toward a center (the ignition position of the ignition plug 34) of the combustion chamber 23, the ignitability and the combustion performance of the fuel are ensured. With the above configuration, both of an improvement in the exhaust emission and the ensuring of the combustion stability can be achieved.

In the ignition retard control to be implemented for catalyst warm-up during the low temperature start of the engine 10, when the fuel injection (third injection in this embodiment) of the rich air-fuel ratio is performed immediately before the ignition corresponding to the ignition timing, a desired combustion can be realized while suppressing the production of the PM.

The multiple first injections (the first injections and the second injection in this embodiment) are implemented during the intake stroke of the engine 10. As a result, in each first injection to be implemented for producing the air-fuel mixture of the lean air-fuel ratio in the combustion chamber 23, the mixing of a fuel and an air can be improved due to an intake air flow, and each homogeneous air-fuel mixture layer can be formed.

In implementation of the divided injections, a process for increasing the division ratio Q3 of the third injection more as the engine rotation speed is lower, a process for increasing the division ratio Q3 of the third injection more as the engine load is smaller, a process for increasing the division ratio Q3 of the third injection more as the retard amount of the ignition timing is larger, and a process for increasing the division ratio Q3 of the third injection more as the water temperature is lower are implemented (Step S15 in FIG. 4). In that case, the fuel amount of the third injection (second injection) can be increased under an engine operating state conceivable to be low in the combustion stability, and further the combustion stability can be enhanced. As a result, the production of the stable air-fuel mixture can be realized against variation factors such as various environmental changes.

(Other Embodiments)

The above embodiment may be changed, for example, as follows.

In the implantation of the divided injections, the division ratio Q3 of the third injection may be calculated on the basis of the following configuration. In other words, the fuel amount of the second injection may be increased. The ECU 40 includes a compression ratio varying unit that varies an actual compression ratio of the engine 10, and the division ratio Q3 of the third injection is increased more as the actual compression ratio is lower. The compression ratio varying unit implements a control (intake retard closing control) for retarding the closing timing of the intake valve 31 relative to the compression TDC is implemented in implementation of a so-called "Atkinson cycle operation". In that case, because the actual compression ratio becomes lower as the closing timing of the intake valve 31 is retarded more, the division ratio Q3 of the third injection is increased.

The ECU 40 includes a calculation unit for calculating an internal EGR amount which is a residual amount (cylinder residual amount+intake side blowback amount) of the combusted gas in the engine 10, and increases the division ratio Q3 of the third injection more as the internal EGR amount is larger. The internal EGR amount is changed according to a valve opening overlap amount of the intake valve 31 and the exhaust valve 32, and the internal EGR amount is calculated on the basis of the valve opening overlap amount calculated according to the control amount of the variable valve mechanisms 31A and 32A on each of the intake side and the exhaust side. In that case, because the internal EGR amount becomes larger as the valve opening overlap amount is larger, the division ratio Q3 of the third injection is increased.

Further, the ECU 40 includes a calculation unit for calculating a combustion variation on the basis of a cylinder combustion pressure, a rotation variation or a torque variation of the engine 10, and the division ratio Q3 of the third injection is increased more as the combustion variation is larger. In that case, the in-cylinder combustion pressure of the engine 10 is obtained from, for example, the detection result of the in-cylinder pressure sensor. The rotation variation or the torque variation of the engine 10 is obtained from the detection result of the crank angle sensor 38. In the cylinder combustion pressure, the rotation variation, or the torque variation, the combustion variation of the engine is calculated by obtaining a variation between the respective cylinders or the degree of deviation from a reference value.

The ECU 40 may include a determination unit for determining a combustion property, and the division ratio Q3 of the third injection may be increased more as the fuel is a heavier system (that is, volatility is lower).

As a calculation parameter for determining the division ratio Q3 of the third injection (increasing the fuel amount of the second injection), at least one of the engine rotation speed, the engine load, the retard amount of the ignition timing, the engine coolant temperature, the actual compression ratio, the internal EGR amount, the combustion variation, and the fuel property may be used, or at least two of arbitrary combinations may be used. The division ratio Q3 of the third injection is implemented in Step S15 of FIG. 4 described above.

In the above embodiment, the case in which the divided injections are implemented with three injections is illustrated. However, without being limited to the above configuration, four or more injections may be implemented. For example, the number of injections may be determined according to the engine operating state (the engine rotation speed or the engine load). The multiple "first injections (lean injections)" may be implemented for each combustion cycle, the first injection implemented early among the multiple "first injections" may produce an air-fuel mixture leaner than that of the first injection implemented subsequently, and the "second injection (rich injection)" may be implemented only once immediately before the ignition timing. When the injection is performed, for example, four times (first injections=three times, second injection=once), the air excess ratios $\lambda 1$, $\lambda 2$, $\lambda 3$, and $\lambda 4$ of the air-fuel mixtures produced by the respective first to fourth injections satisfy $\lambda 1 > \lambda 2 > \lambda 3 > 1.0$, and $\lambda 4 < 1.0$. The three first injections are each implemented during the intake stroke.

In the above embodiment, when the multiple "first injections" are implemented in the intake stroke, the fuel injection is terminated during the intake stroke in each of the multiple first injections. In the last first injection among the multiple first injections, an injection end timing of the last first injection may be in the compression stroke (that is, after the intake BDC).

In the cylinder injection engine, a position to which the injector 21 is attached may be arbitrary if the fuel injection toward the ignition position of the ignition plug 34 can be performed, and the injector 21 may be disposed in the center (in the vicinity of the ignition plug) of the combustion chamber.

What is claimed is:

1. A control device for a cylinder injection engine including a fuel injection valve for directly injecting a fuel into a combustion chamber, and an ignition device that generates an ignition spark in the combustion chamber in which the fuel injected from the fuel injection valve is combusted by the ignition of the ignition device, the control device comprising:

a first injection control unit that performs a plurality of first injections by the fuel injection valve to each produce an air-fuel mixture of a lean air-fuel ratio in the combustion chamber before the ignition device performs an ignition in one combustion cycle of the engine; and a second injection control unit that performs a second injection by the fuel injection valve to produce an air-fuel mixture of a rich air-fuel ratio in the combustion chamber before the ignition of the ignition device and after the first injection, wherein the first injection control unit implements the plurality of first injections to allow the first injection implemented early among the plurality of first injections to produce an air-fuel mixture leaner than that of the first injection implemented subsequently, and the first injection control unit calculates an injection amount of fuel divided as an injection amount of the second injection from a total injection amount of one combustion cycle, and calculates an injection amount of the first injection based on a remaining amount of fuel obtained by subtracting an amount of fuel divided as an injection amount of the second injection from a total injection amount of one combustion cycle upon execution of the first injection, and the second injection control unit implements the second injection only once immediately before an ignition timing of the ignition device.

2. The control device for a cylinder injection engine according to claim 1, wherein the first injection control unit calculates the injection amount of each first injection obtained by dividing the remaining amount of fuel according to the number of injections of the first injection.

3. The control device for a cylinder injection engine according to claim 1, wherein the second injection control unit sets the injection amount at the second injection based on an engine operating state.

4. The control device for a cylinder injection engine according to claim 2, wherein the second injection control unit sets the injection amount at the second injection based on an engine operating state.

5. The control device for a cylinder injection engine according to claim 1, further comprising a calculation unit that calculates a combustion variation on the basis of a cylinder combustion pressure, a rotation variation, or a torque variation of the engine, wherein the second injection control unit increases the fuel amount of the second injection more as the combustion variation is larger.

6. The control device for a cylinder injection engine according to claim 2, further comprising a calculation unit that calculates a combustion variation on the basis of a cylinder combustion pressure, a rotation variation, or a torque variation of the engine, wherein the second injection control unit increases the fuel amount of the second injection more as the combustion variation is larger.

7. The control device for a cylinder injection engine according to claim 3, further comprising a calculation unit that calculates a combustion variation on the basis of a cylinder combustion pressure, a rotation variation, or a torque variation of the engine, wherein the second injection control unit increases the fuel amount of the second injection more as the combustion variation is larger.

8. The control device for a cylinder injection engine according to claim 4, further comprising a calculation unit that calculates a combustion variation on the basis of a cylinder combustion pressure, a rotation variation, or a torque variation of the engine, wherein the second injection control unit increases the fuel amount of the second injection more as the combustion variation is larger.

9. The control device for a cylinder injection engine according to claim 1, wherein
an air-fuel mixture of lean is produced in the overall combustion chamber in one combustion cycle of the engine by means of the plurality of first injections and the second injection.

10. The control device for a cylinder injection engine according to claim 2, wherein
an air-fuel mixture of lean is produced in the overall combustion chamber in one combustion cycle of the engine by means of the plurality of first injections and the second injection.

11. The control device for a cylinder injection engine according to claim 3, wherein
an air-fuel mixture of lean is produced in the overall combustion chamber in one combustion cycle of the engine by means of the plurality of first injections and the second injection.

12. The control device for a cylinder injection engine according to claim 5, wherein
an air-fuel mixture of lean is produced in the overall combustion chamber in one combustion cycle of the engine by means of the plurality of first injections and the second injection.

13. The control device for a cylinder injection engine according to claim 4, wherein
an air-fuel mixture of lean is produced in the overall combustion chamber in one combustion cycle of the engine by means of the plurality of first injections and the second injection.

14. The control device for a cylinder injection engine according to claim 6, wherein
an air-fuel mixture of lean is produced in the overall combustion chamber in one combustion cycle of the engine by means of the plurality of first injections and the second injection.

15. The control device for a cylinder injection engine according to claim 8, wherein
an air-fuel mixture of lean is produced in the overall combustion chamber in one combustion cycle of the engine by means of the plurality of first injections and the second injection.

16. The control device for a cylinder injection engine according to claim 1, wherein
the first injection control unit implements the plurality of first injections during an intake stroke of the engine, and
the second injection control unit implements the second injection during an compression stroke of the engine.

* * * * *